US008644240B2

(12) United States Patent
Ishii et al.

(10) Patent No.: US 8,644,240 B2
(45) Date of Patent: Feb. 4, 2014

(54) USER EQUIPMENT AND MOBILE COMMUNICATION METHOD

(75) Inventors: Hiroyuki Ishii, Yokohama (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/390,974

(22) PCT Filed: Aug. 16, 2010

(86) PCT No.: PCT/JP2010/063818
§ 371 (c)(1),
(2), (4) Date: Apr. 30, 2012

(87) PCT Pub. No.: WO2011/021604
PCT Pub. Date: Feb. 24, 2011

(65) Prior Publication Data
US 2012/0224529 A1    Sep. 6, 2012

(30) Foreign Application Priority Data

Aug. 19, 2009    (JP) .............................. P2009-190419

(51) Int. Cl.
*H04W 4/00* (2009.01)
*H04B 7/00* (2006.01)
(52) U.S. Cl.
USPC ........... 370/329; 370/343; 370/345; 455/525; 455/561

(58) Field of Classification Search
USPC ................ 370/345, 329, 316, 203, 260, 343; 455/67.16, 525, 561, 445; 375/299, 375/260, 315, 286, 146, 141; 726/1–21
See application file for complete search history.

(56) References Cited

U.S. PATENT DOCUMENTS

| 8,125,974 B2 * | 2/2012 | Sutton ........................... 370/348 |
| 2010/0184448 A1 * | 7/2010 | Wu ............................... 455/450 |
| 2010/0265847 A1 * | 10/2010 | Lee et al. ...................... 370/254 |
| 2012/0224529 A1 * | 9/2012 | Ishii et al. ..................... 370/328 |

FOREIGN PATENT DOCUMENTS

| CN | 101426255 A | 5/2009 |
| JP | 2001-69556 A | 3/2001 |
| JP | 2002-165267 A | 6/2002 |
| JP | 2004-120258 A | 4/2004 |
| JP | 2007-96522 A | 4/2007 |

OTHER PUBLICATIONS

"3GPP TS 36.101 Version 8.4.0 Release 8, Evolved Universal Terrestrial Radio Access (E-UTRA) User Equipment (UE) radio transmission and reception" published Jan. 2009, 99 pages.*
International Search Report w/translation from PCT/JP2010/063818 dated Sep. 7, 2010 (4 pages).

(Continued)

*Primary Examiner* — Michael Thier
*Assistant Examiner* — Benjamin H Elliott, IV
(74) *Attorney, Agent, or Firm* — Osha Liang LLP (57) ABSTRACT

A user equipment 100*n* according to the present invention includes a broadcast information reception unit 112 configured to receive broadcast information in a downlink, wherein the broadcast information reception unit 112 is configured to regard the corresponding cell as a restricted cell when information included in the broadcast information is an unsupported value.

3 Claims, 4 Drawing Sheets

(56) References Cited

OTHER PUBLICATIONS

3GPP TS 36.300 V8.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Dec. 2008 (144 pages).

3GPP TS 36.211 V8.4.0; "3rd Generation Partnership Project; Technical Specification Group Radio Access Network; Evolved Universal Terrestrial Radio Access (E-UTRA); Physical Channels and Modulation (Release 8)"; Sep. 2008 (78 pages).

Korean Office Action for Application No. 10-2012-7004378, mailed on Aug. 7, 2012 (6 pages).

Qualcomm Europe, "Handling of unsupported/non-comprehended frequency band and emission requirement", 3GPP TSG-RAN WG2 meeting #67, R2-094290, Shenzhen, China, Aug. 24-28, 2009.

Office Action for Korean Application No. 10-2012-7004378 dated Jan. 7, 2013, with English translation thereof (5 pages).

Office Action for Chinese Patent Application No. 201080036715.2 issued Oct. 9, 2012, with English translation thereof (11 pages).

Espacenet, Patent Abstract for Chinese Publication No. 101426255 published May 6, 2009 (1 page).

Office Action in corresponding Korean application No. 10-2012-7004378 dated Apr. 29, 2013 (7 pages).

Panasonic; "Discussion of Tx-Rx separation"; 3GPP TSG RAN WG2 #66, R2-092859; San Francisco, U.S.A.; May 4-8, 2009 (2 pages).

* cited by examiner

USER EQUIPMENT AND MOBILE COMMUNICATION METHOD

TECHNICAL FIELD

The present invention relates to a technology field of mobile communication, and more particularly, to a user equipment and a mobile communication method in a mobile communication system using a next-generation mobile communication technology.

BACKGROUND ART

A standards determination work related to a next-generation communication scheme of a wideband code division multiplexing access (W-CDMA) scheme, a high speed downlink packet access (HSDPA) scheme, a high speed uplink packet access (HSUPA) scheme and the like, that is, a standard determination work related to an LTE (long term evolution) (E-UTRA) scheme is under progress in 3GPP, which is a group aiming to standardize.

As a radio access scheme of the LTE scheme, an OFDMA (Orthogonal Frequency Division Multiplexing Access) scheme has been employed for a downlink, and an SC-FDMA (Single-Carrier Frequency Division Multiple Access) scheme has been employed for an uplink.

The OFDMA scheme is a multi-carrier transmission scheme in which a frequency band is divided into a plurality of narrow frequency bands (sub-carriers) and data is loaded on each sub-carrier and is transmitted. According to the OFDMA scheme, the sub-carriers are densely arranged on a frequency axis while being orthogonal to the frequency axis, so that high-rate transmission can be achieved, and frequency use efficiency can be expected to be improved.

The SC-FDMA scheme is a single-carrier transmission scheme in which a frequency band is divided for each terminal and a plurality of terminals transmit data using different frequency bands. According to the SC-FDMA scheme, since inter-terminal interference can be simply and effectively reduced and a variation in transmission power is small, the SC-FDMA scheme is advantageous in terms of lower power consumption of a terminal, expansion of coverage, and the like.

In an LTE mobile communication system, in both a downlink and an uplink, one to two or more resource blocks are assigned to a user equipment so that communication is performed. Here, the resource blocks are shared by one to two or more user equipments in the mobile communication system.

A base station device is configured to decide a user equipment, to which a resource blocks is to be assigned, among one to two or more user equipments, for each subframe (1 ms in the LTE scheme) (such a process is called "scheduling").

In the downlink, the base station device is configured to transmit a shared channel signal to a user equipment, which has been selected through the scheduling, by using one to two or more resource blocks.

In the uplink, the user equipment selected through the scheduling is configured to transmit a shared channel signal to the base station device by using one to two or more resource blocks.

In the mobile communication system using the shared channel as described above, it is necessary to perform signaling of a user equipment, to which the above-mentioned shared channel is to be assigned, for each subframe (1 ms in the LTE scheme).

In the LTE scheme, a control channel used in such signaling is called PDCCH (Physical Downlink Control Channel) or "downlink L1/L2 Control Channel (DL-L1/L2 Control Channel)".

For example, "downlink scheduling information", "uplink scheduling grant" and the like are mapped to information on the physical downlink control channel. In addition, the above-mentioned downlink scheduling information or uplink scheduling grant is also called "DCI (Downlink Control Information)". The above-mentioned downlink scheduling information or uplink scheduling grant corresponds to information for performing signaling of a user equipment to which the above-mentioned shared channel is to be assigned.

Meanwhile, in cellular phones, radio astronomy, satellite communication, air and sea radar, earth resources survey, and a wireless LAN, which are mobile communication systems using a radio wave, frequency bands to be used are generally separated from one another in order to prevent mutual interference.

Furthermore, for example, a plurality of mobile communication systems use frequency bands assigned to cellular phone systems, and frequency bands to be used in the mobile communication systems are separated from one another. That is, the mobile communication systems using radio waves separates frequency bands to be used from one another, thereby preventing inter-system interference.

Here, when a transmitter radiating a radio wave has not transmitted a signal at a frequency determined in advance, or when it has transmitted the signal at the frequency determined in advance but has transmitted an unnecessary wave (or an interference wave) with power larger than a permitted value to a frequency band different from a frequency band of an own system, it may have a significant adverse influence on other systems with different frequencies.

In order to avoid the above-mentioned adverse influence, for a user equipment in a mobile communication system, an operation for reading broadcast information from a base station device and then transmitting an uplink signal based on the scope of "Receive before transmit" has been defined.

In the "Receive before transmit", the "receive" indicates an operation for receiving the broadcast information, and the "transmit" indicates an operation for transmitting the uplink signal.

The scope is based on the assumption that in relation to a base station device, a provider providing the mobile communication system appropriately operates the mobile communication system under the monitoring of administration of each country, but a user equipment is not monitored because it is a radio communication terminal owned by a general user.

SUMMARY OF THE INVENTION

Problems to be Solved by the Invention

However, the above-mentioned background technology has the following problems.

In general, since a version of a mobile communication system is upgraded on demand, a user equipment with a previously released version may not understand an information element of broadcast information newly added among the broadcast information transmitted by a base station device with a new version released later.

In this case, when the newly added information element of the broadcast information indicates information for allowing a signal to be transmitted at a frequency determined in advance, or allowing an unnecessary wave with power larger than a permitted value not to be transmitted to a frequency band different from a frequency band of an own system as described above, it is not possible for the user equipment with a previously released version to understand the meaning of the information element, so that an appropriate operation is not performed, resulting in the occurrence of significant adverse influence.

Furthermore, regardless of the above-mentioned release, when a function associated with an information element of broadcast information has been defined as an optional function, a user equipment may not understand the information element, or may not support the information element. Even in this case, similarly to the above, an appropriate operation is not performed, resulting in the occurrence of significant adverse influence.

Therefore, the present invention has been achieved in view of the above-described problems, and an object thereof is to provide a user equipment and a mobile communication method, capable of avoiding a phenomenon that other systems are adversely affected by an unnecessary interference wave when information included in broadcast information transmitted by a base station device is an unsupported value.

Means for Solving the Problem

A first characteristic of the present invention is summarized as a user equipment, which communicates with a base station device in a radio manner in a cell where the base station device provides a mobile communication service, the user equipment comprising a broadcast information reception unit configured to receive broadcast information in a downlink, in which the broadcast information reception unit is configured to regard the cell as a restricted cell when information included in the broadcast information is an unsupported value.

A second characteristic of the present invention is summarized as a mobile communication method in a user equipment which communicates with a base station device in a radio manner in a cell where the base station device provides a mobile communication service, the mobile communication method comprising: a first step of receiving broadcast information in a downlink, in which in the first step, the cell is regarded as a restricted cell when information included in the broadcast information is not supported.

Effect of the Invention

As described above, according to the present invention, it is possible to provide a user equipment and a mobile communication method, capable of avoiding a phenomenon that other systems are adversely affected by an unnecessary interference wave when information included in broadcast information transmitted by a base station device is an unsupported value.

Means for Solving the Problem

BEST MODES FOR CARRYING OUT THE INVENTION (Mobile Communication System According to First Embodiment of the Present Invention)

Hereinafter, a mobile communication system according to a first embodiment of the present invention will be described with reference to the accompanying drawings.

Throughout all the drawings for explaining the present embodiment, elements having the same function will be designated by the same reference numerals, and repetitive explanation thereof will be omitted.

Figure 1:
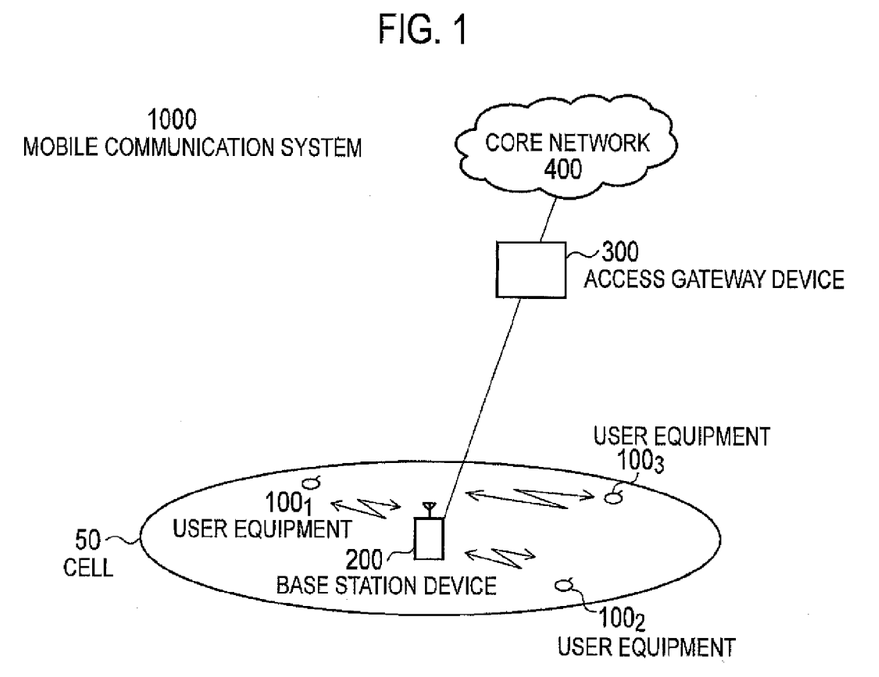
FIG. 1 is a diagram illustrating the entire configuration of a mobile communication system according to a first embodiment of the present invention.

With reference to FIG. 1, a mobile communication system including user equipments $100n$ ($1001$, $1002$, $1003$, ..., $100n$, $n$ is an integer>0) and a base station device $200$ according to the present embodiment will be described.

A mobile communication system $1000$, for example, is a system to which an "Evolved UTRA and UTRAN (another name: Long Term Evolution or Super 3G)" scheme or an LTE-Advanced is applied.

The mobile communication system $1000$ includes the base station device (eNB: eNode B) $200$, and a plurality of user equipments (UEs) $100n$ ($1001$, $1002$, $1003$, ..., $100n$, $n$ is an integer>0) communicating with the base station device $200$.

The base station device $200$ is connected to an upper station, for example, an access gateway device $300$, and the access gateway device $300$ is connected to a core network $400$. The user equipment $100n$ communicates with the base station device $200$ in a cell $50$ by using the "Evolved UTRA and UTRAN" scheme. In addition, the access gateway device $300$ may also be called MME/SGW (Mobility Management Entity/Serving Gateway).

Since the user equipments ($1001$, $1002$, $1003$, ..., $100n$) have the same configuration, function, and state, they will be described as the user equipment $100n$ below unless specifically stated otherwise. For the purpose of convenience, an object communicating with a base station device in a radio manner is called as a user equipment. However, the present invention can be applied to a case where a mobile station and a mobile terminal (MS: Mobile Station) including a mobile terminal and a fixed terminal are used.

In the mobile communication system $1000$, as a radio access scheme, an OFDMA (Orthogonal Frequency Division Multiplexing Access) scheme has been applied to a downlink, and an SC-FDMA (Single-Carrier Frequency Division Multiplexing Access) scheme has been applied to an uplink.

As described above, the OFDMA scheme is a multi-carrier transmission scheme in which a frequency band is divided into a plurality of narrow frequency bands (sub-carriers) and data is mapped to each sub-carrier, so that communication is performed. Furthermore, the SC-FDMA scheme is a single-carrier transmission scheme in which a frequency band is divided for each terminal and a plurality of terminals use frequency bands different from one another, so that interference among the terminals is reduced.

Here, a communication channel used in the "Evolved UTRA and UTRAN" scheme will be described.

For a downlink, "physical downlink shared channel (PDSCH)" and "physical downlink control channel (PDCCH)" shared by each user equipment 100n are used.

The "physical downlink shared channel (PDSCH)" is used to transmit user data, that is, a normal data signal. Furthermore, the PDCCH is used to notify information (that is, downlink scheduling information) on a transport format of an ID or user data of a user performing communication using the PDSCH, information (that is, an uplink scheduling grant) on a transport format of an ID or user data of a user performing communication using PUSCH (Physical Uplink Shared Channel), and the like.

The PDCCH may also be called "Downlink L1/L2 Control Channel". Furthermore, the "downlink scheduling information" or the "uplink scheduling grant" may also be collectively called "downlink control information (DCI)".

Furthermore, in a downlink, "BCCH: Broadcast Control Channel" is transmitted as a logical channel.

A part of the BCCH is mapped to "BCH: Broadcast Channel" (a transport channel), and information mapped to the BCH is transmitted to the user equipment 100n in a corresponding cell through "P-BCH: Physical Broadcast Channel" (a physical channel).

Furthermore, a part of the BCCH is mapped to "DL-SCH: Downlink Shared Channel" (a transport channel), and information mapped to the DL-SCH is transmitted to the user equipment 100n in the corresponding cell through the "PDSCH" (a physical channel).

A broadcast channel transmitted through the BCCH/DL-SCH/PDSCH may also be called a dynamic broadcast channel (D-BCH).

In addition, AdditionalSpectrumEmission is notified as an information element transmitted through the BCCH, wherein the AdditionalSpectrumEmission is for notifying whether additional spectrum emission definition is applied. For example, the AdditionalSpectrumEmission may also be notified as an information element of a part of "SIB: System Information Block Type 2" which is one of BCCH signals.

In addition, the AdditionalSpectrumEmission may also be notified to the user equipment 100n from the base station device 200 through an RRC message. Here, the RRC message, for example, may also include "Handover Command" which is an RRC message indicating a Handover. In addition, the RRC message corresponds to DCCH (Dedicated Control Channel) as a logic channel.

In addition, the AdditionalSpectrumEmission may also be notified to the user equipment 100n as a part of an information element of a system information block other than the above-mentioned SIB2.

For an uplink, the PUSCH and the PUCCH shared by each user equipment 100n are used. The PUSCH is used to transmit user data, that is, a normal data signal.

Furthermore, the PUCCH is used to transmit quality information (CQI: Channel Quality Indicator) of a downlink, which is to be used in a scheduling process or an adaptive modulation/demodulation and coding process (AMCS: Adaptive Modulation and Coding Scheme) of the PDSCH, and transmission acknowledgement information (Acknowledgement Information) of the PUSCH.

The content of the transmission acknowledgement information is expressed by any one of a positive response (ACK: Acknowledgement) indicating that a transmission signal has been appropriately received, and a negative response (NACK: Negative Acknowledgement) indicating that the transmission signal has not been appropriately received.

In addition, when a transmission timing of the above-mentioned CQI or transmission acknowledgement information is equal to a transmission timing of the PUSCH, the CQI or transmission acknowledgement information may also be multiplexed to the PUSCH for transmission.

Figure 2:
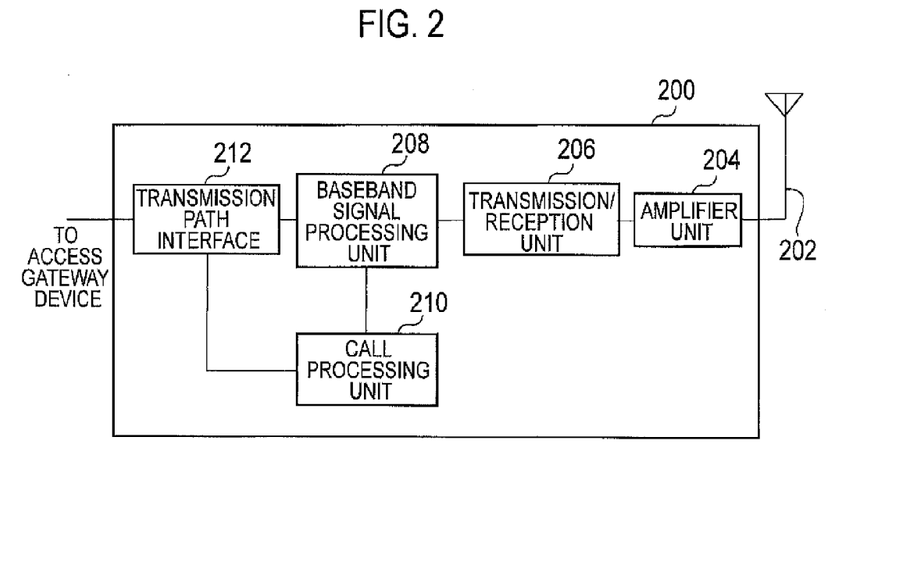
FIG. 2 is a functional block diagram of a base station device according to the first embodiment of the present invention.

Hereinafter, with reference to FIG. 2, the base station device 200 according to the present embodiment will be described.

The base station device 200 includes a transmission/reception antenna 202, an amplifier unit 204, a transmission/reception unit 206, a baseband signal processing unit 208, a call processing unit 210, and a transmission path interface 212.

User data to be transmitted from the base station device 200 to the user equipment 100n through a downlink is input to the baseband signal processing unit 208 from an upper station (which is positioned at a higher level than the base station device 200), for example, the access gateway device 300 via the transmission path interface 212.

The user data is subject to a PDCP layer transmission process, an RLC (radio link control) layer transmission process such as a division/combination process or an RLC retransmission control process, or an MAC (Medium Access Control) retransmission control process, for example, an HARQ (Hybrid Automatic Repeat reQuest) transmission process, a scheduling process, a transmission format selection process, a channel coding process, an IFFT (Inverse Fast Fourier Transform) process and the like in the baseband signal processing unit 208, and then is transferred to the transmission/reception unit 206.

Furthermore, the DCCH corresponding to the RRC message is also subject to the transmission process including the channel coding process, the inverse fast Fourier transform process and the like, and then is transferred to the transmission/reception unit 206.

Furthermore, a downlink control signal to be transmitted via the PDCCH (the downlink control channel) is also subject to the transmission process including the channel coding process, the inverse fast Fourier transform process and the like, and then is transferred to the transmission/reception unit 206.

Furthermore, the baseband signal processing unit 208 generates a BCCH signal (broadcast information), performs the transmission process including the channel coding process, the inverse fast Fourier transform process and the like with respect to the BCCH signal, and transfers a processed BCCH signal to the transmission/reception unit 206.

In addition, the BCCH signal includes a signal mapped to the BCH as the transport channel and mapped to the P-BCH as the physical channel, and a signal mapped to the DL-SCH as the transport channel and mapped to the PDSCH as the physical channel, as described above.

A baseband signal output from the baseband signal processing unit 208 is subject to a frequency conversion process for a conversion to a radio frequency signal by the transmission/reception unit 206, is amplified by the amplifier unit 204, and then is transmitted through the transmission/reception antenna 202.

Meanwhile, for data to be transmitted from the user equipment 100n to the base station device 200 through an uplink, a radio frequency signal received in the transmission/reception antenna 202 is amplified by the amplifier unit 204, is converted to a baseband signal through a frequency conversion process of the transmission/reception unit 206, and is input to the baseband signal processing unit 208.

The baseband signal processing unit 208 performs an FFT process, an IDFT process, an error correction decoding process, a reception process of MAC retransmission control, an RLC layer reception process, a PDCP layer reception process and the like with respect to user data included in the input baseband signal, and transfers processed data to the access gateway device 300 via the transmission path interface 212.

The call processing unit 210 performs call process such as setting or release of a communication channel, state management of the radio base station device 200, or management of a radio resource.

Figure 3:
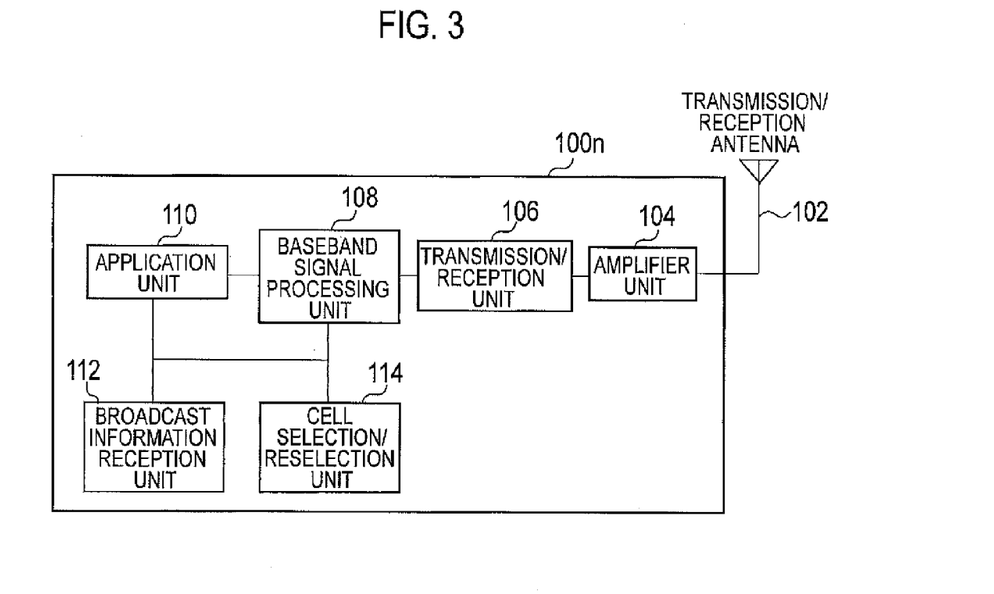
FIG. 3 is a functional block diagram of a user equipment according to the first embodiment of the present invention.

With reference to FIG. 3, the user equipment 100n according to the present embodiment will be described. As illustrated in FIG. 3, the user equipment 100n includes a transmission/reception antenna 102, an amplifier unit 104, a transmission/reception unit 106, a baseband signal processing unit 108, an application unit 110, a broadcast information reception unit 112, and a cell selection/reselection unit 114.

For downlink data, a radio frequency signal received in the transmission/reception antenna 102 is amplified by the amplifier unit 104, and is converted to a baseband signal through a frequency conversion process of the transmission/reception unit 106.

The baseband signal is subject to an FFT process, an error correction decoding process, a reception process of retransmission control, and the like, in the baseband signal processing unit 108. Downlink user data of the downlink data is transferred to the application unit 110 and is subject to a process and the like related to an upper layer by a physical layer and an MAC layer in the application unit 110.

Furthermore, broadcast information of the downlink data is transferred to the broadcast information reception unit 112 via the application unit 110. The broadcast information corresponds to the BCCH as the logical channel, and includes information mapped to the BCH as the transport channel and mapped to the P-BCH as the physical channel, and information mapped to the DL-SCH as the transport channel and mapped to the PDSCH as the physical channel, as described above.

In the above-mentioned example, the broadcast information is transferred to the broadcast information reception unit 112 via the application unit 110. However, instead, the broadcast information may also be directly transferred to the broadcast information reception unit 112 from the baseband signal processing unit 108.

Furthermore, a downlink reference signal included in the baseband signal is extracted in the baseband signal processing unit 108 and is sent to the cell selection/reselection unit 114.

The application unit 110 performs a process and the like related to an upper layer than a physical layer and an MAC layer.

The broadcast information reception unit 112 directly receives the broadcast information from the baseband signal processing unit 108, or receives the broadcast information from the baseband signal processing unit 108 via the application unit 110.

Then, when information included in the broadcast information is an unsupported value, the broadcast information reception unit 112 is configured to regard a cell where the broadcast information has been transmitted as "restricted cell".

Here, the "restricted cell", for example, may be a Barred Cell, may also be a cell where access or communication is limited, or may also be called a cell where access or communication is prohibited.

Furthermore, regarding the cell as the "restricted cell" may correspond to an operation for treating the cell as the "restricted cell".

That is, when the information included in the broadcast information is the unsupported value, the broadcast information reception unit 112 may also regard that access to the cell has been restricted or prohibited.

Otherwise, when the information included in the broadcast information is the unsupported value, the broadcast information reception unit 112 may also regard that communication with the cell has been restricted or prohibited.

Furthermore, the meaning of "the information included in the broadcast information is not supported", for example, may represent that a value not supported by the user equipment 100n is notified as the information included in the broadcast information, or a value not recognizable by the user equipment 100n is notified as the information included in the broadcast information.

In relation to a predetermined information element designated in advance, when an information element included in the broadcast information is an unsupported value, the broadcast information reception unit 112 may also regard the cell as the "restricted cell".

In this case, in relation to an information element other than the predetermined information element designated in advance, even when the information element included in the broadcast information is the unsupported value, the broadcast information reception unit 112 may also perform a process for preventing the cell from being regarded as the "restricted cell".

The above-mentioned operation will be more specifically described.

For example, when a value of a system bandwidth is notified as an information element included in broadcast information and is a value not supported by the user equipment 100n, the broadcast information reception unit 112 may also regard a cell where the broadcast information is transmitted as the "restricted cell". Here, the value of the system bandwidth may also correspond to an uplink system bandwidth or a downlink system bandwidth.

More specifically, when a 4 MHz is notified as the value of the system bandwidth and is a value of a system bandwidth not supported by the user equipment 100n, the broadcast information reception unit 112 may also regard a cell where the system bandwidth of the 4 MHz is notified as the "restricted cell".

The value of the system bandwidth may also correspond to a value of a system bandwidth of a component carrier when Carrier Aggregation is performed.

In this case, when a system bandwidth of at least one component carrier is an unsupported system bandwidth, the broadcast information reception unit 112 may also regard the cell as the "restricted cell".

Otherwise, when a system bandwidth of all component carriers is an unsupported system bandwidth, the broadcast information reception unit 112 may also regard the cell as the "restricted cell". The system bandwidth of the component carrier may simply correspond to a system bandwidth or a channel bandwidth if it is a value indicating a total bandwidth at one component carrier.

For example, when a value of an uplink frequency is notified as an information element included in broadcast information and is a value not supported by the user equipment 100n, the broadcast information reception unit 112 may also regard a cell where the broadcast information is transmitted as the "restricted cell". Here, when a downlink frequency, other than the value of the uplink frequency, is a value not supported by the user equipment 100n, the broadcast information reception unit 112 may also regard a cell where the broadcast information is transmitted as the "restricted cell".

Otherwise, when the difference between the downlink frequency and the uplink frequency is a value not supported by the user equipment 100n, the broadcast information reception unit 112 may also regard the cell where the broadcast information is transmitted as the "restricted cell".

The difference between the downlink frequency and the uplink frequency may also be called TX-RX Frequency Separation or TX-RX carrier centre frequency separation.

More specifically, when 2000 MHz is notified as the value of the uplink frequency and is a value of an uplink frequency not supported by the user equipment 100n, the broadcast information reception unit 112 may also regard a cell where the uplink frequency of the 2000 MHz is notified as the "restricted cell".

Otherwise, when the difference between a downlink frequency and an uplink frequency, which is calculated from the value of the uplink frequency and the value of the downlink frequency as the value of the uplink frequency, is a value not supported by the user equipment 100n, the broadcast information reception unit 112 may also regard the cell where the broadcast information is transmitted as the "restricted cell". Here, the downlink frequency, for example, may also be calculated by receiving a downlink synchronization signal in cell search.

The value of the uplink or downlink frequency or the difference between the downlink frequency and the uplink frequency may also be the value of an uplink or downlink frequency of a component carrier or the difference between the downlink frequency and the uplink frequency when the carrier aggregation is performed.

In this case, when an uplink or downlink frequency of at least one component carrier or the difference between the downlink frequency and the uplink frequency is an unsupported frequency, the broadcast information reception unit 112 may also regard the cell as the "restricted cell".

Otherwise, when an uplink or downlink frequency of all component carriers or the difference between the downlink frequency and the uplink frequency is an unsupported frequency, the broadcast information reception unit 112 may also regard the cell as the "restricted cell".

For example, when information indicating a frequency band when the carrier aggregation is performed is notified as an information element included in broadcast information and a frequency band when the carrier aggregation is performed is a frequency band not supported by the user equipment 100n, the broadcast information reception unit 112 may also regard a cell where the broadcast information is transmitted as the "restricted cell".

More specifically, when a Band 1 and a Band 3 are notified as frequency bands when the carrier aggregation is performed and carrier aggregation of the Band 1 and the Band 3 is not supported by the user equipment 100n, the broadcast information reception unit 112 may also regard the cell as the "restricted cell".

The meaning that the frequency band when the carrier aggregation is performed is not supported may represent that at least one of a plurality of frequency bands for which the carrier aggregation is not supported, or may also represent that a combination of frequency bands when the carrier aggregation is performed is not supported.

Otherwise, the meaning that the frequency band when the carrier aggregation is performed is not supported may also represent that all of a plurality of frequency bands for which the carrier aggregation is performed are not supported.

In the above-mentioned example, it is decided whether to regard a cell as the "restricted cell" based on whether the frequency band when the carrier aggregation is performed is supported. Instead, it may also be decided whether to regard the cell as the "restricted cell" based on whether information associated with a carrier frequency when the carrier aggregation is performed is supported. Here, the information associated with the carrier frequency may correspond to a value of the frequency itself, or may also correspond to a value of a center frequency.

Otherwise, in the case where a frequency band for transmitting uplink control information when the carrier aggregation is performed is a frequency band not supported by the user equipment 100n, the broadcast information reception unit 112 may also regard a corresponding cell as the "restricted cell". In the above-mentioned process, whether a frequency of the uplink control information, other than the frequency band for transmitting the uplink control information, is supported may also be determined.

Otherwise, in the case where a frequency band for transmitting uplink random access channel when the carrier aggregation is performed is a frequency band not supported by the user equipment 100n, the broadcast information reception unit 112 may also regard the corresponding cell as the "restricted cell". In the above-mentioned process, whether a frequency of the uplink random access channel, other than the frequency band for transmitting the uplink random access channel, is supported may also be determined.

As described above, when information indicating the system bandwidth, information indicating the uplink frequency, and the like are not supported, the corresponding cell is regarded as the "restricted cell", so that it is possible to avoid adverse influence to other systems due to careless transmission of an uplink signal.

Otherwise, for example, when AdditionalSpectrumEmission for notifying whether additional spectrum emission definition is applied is notified as an information element included in broadcast information and a value of the AdditionalSpectrumEmission is a value not supported by the user equipment 100n, the broadcast information reception unit 112 may also regard a cell where the broadcast information is transmitted as the "restricted cell".

The AdditionalSpectrumEmission, for example, may also correspond to an information element additionally applied in order to suppress interference to other systems.

More specifically, when NS__12 is notified as a value of the AdditionalSpectrumEmission and is a value not supported by the user equipment 100n, the broadcast information reception unit 112 may also regard a cell where the AdditionalSpectrumEmission is notified as the "restricted cell".

Otherwise, for example, when AdditionalSpectrumEmission for notifying whether additional spectrum emission definition is applied is notified as an information element included in broadcast information and a value of the AdditionalSpectrumEmission is a value not recognized by the user equipment 100n, the broadcast information reception unit 112 may also regard a cell where the broadcast information is transmitted as the "restricted cell".

Here, the unrecognized value, for example, may be a value defined in release after release supported by the user equipment 100n, or may also be a value not recognizable by the user equipment 100n.

Furthermore, the unsupported value, for example, has been defined such that whether to support the NS__12 can be selected as an optional function, and may be a value not supported as an operation of the user equipment 100n.

More specifically, when the NS__12 is notified as the value of the AdditionalSpectrumEmission and is a value not recognized by the user equipment 100n, the broadcast information reception unit 112 may also regard the cell where the AdditionalSpectrumEmission is notified as the "restricted cell".

Hereinafter, when the value of the AdditionalSpectrumEmission is a value not supported by the user equipment 100$n$ or a value not recognized by the user equipment 100$n$, an effect obtained by regarding the cell as the "restricted cell" by the broadcast information reception unit 112 will be described.

An information element of the AdditionalSpectrumEmission is notified in order to reduce the level of interference to other systems, or to allow the level of the interference to other systems to be equal to or less than a permitted value.

That is, the user equipment 100$n$ performs an operation for reducing the level of the interference to other systems or allowing the level of the interference to other systems to be equal to or less than the permitted value, based on the information element of the AdditionalSpectrumEmission.

In other words, regardless of the fact that the value of the AdditionalSpectrumEmission is an unsupported value or an unrecognizable value, when performing communication with a corresponding cell or attempting to perform communication, it is probable that an interference signal is transmitted to other systems, resulting in the degradation of communication quality of other systems.

Consequently, when the value of the AdditionalSpectrumEmission is the unsupported value or the unrecognizable value, the broadcast information reception unit 112 may also regard the corresponding cell as the "restricted cell", thereby avoiding the degradation of the above-mentioned communication quality of other systems.

Otherwise, for example, the broadcast information reception unit 112 may also perform determination regarding whether to regard the corresponding cell as the "restricted cell" based on at least one of AdditionalSpectrumEmission for notifying whether additional spectrum emission definition included in broadcast information is applied, a frequency of a downlink or an uplink of the corresponding cell, and a system bandwidth of the corresponding cell.

For example, when the value of the AdditionalSpectrumEmission is NS_15 and a frequency of a downlink or an uplink of the corresponding cell is included in a predetermined frequency band, the broadcast information reception unit 112 may also be configured to regard the corresponding cell as the "restricted cell".

The predetermined frequency band, for example, may correspond to a frequency range of 1000 MHz to 1200 MHz, a frequency range of 1000 MHz or less, a frequency range of 1400 MHz or more, or a frequency value of 1300 MHz.

Here, it shows the effect that the broadcast information reception unit 112 performs determination regarding whether to regard the corresponding cell as the "restricted cell" based on the value of the AdditionalSpectrumEmission and the frequency of the downlink or the uplink.

The degree of the above-mentioned influence of the interference signal to other systems generally depends on whether a frequency band of an own system is close to frequency bands of other systems. Consequently, determination regarding whether to regard the corresponding cell as the "restricted cell" is performed based on the frequency of the own system in addition to information regarding whether the value of the AdditionalSpectrumEmission is supported, so that it is possible to more appropriately perform the determination regarding whether to regard the corresponding cell as the "restricted cell".

For example, since the broadcast information reception unit 112 regards the corresponding cell as the "restricted cell" only when the frequency of the own system is close to the frequencies of other systems and the value of the AdditionalSpectrumEmission is not supported, if the frequency of the own system is remote from the frequencies of other systems, even when the value of the AdditionalSpectrumEmission is not supported by the UE, the broadcast information reception unit 112 need not regard the corresponding cell as the "restricted cell", that is, it is possible to visit the corresponding cell and perform communication in the corresponding cell.

Otherwise, for example, when the value of the AdditionalSpectrumEmission is NS_15, a frequency of a downlink or an uplink of the corresponding cell is included in a predetermined frequency band, and a system bandwidth of the corresponding cell has a predetermined value, the broadcast information reception unit 112 may also be configured to regard the corresponding cell as the "restricted cell".

The predetermined frequency band, for example, may correspond to a frequency range of 1000 MHz to 1200 MHz, a frequency range of 1000 MHz or less, a frequency range of 1400 MHz or more, or a frequency value of 1300 MHz.

Furthermore, the case where the system bandwidth of the corresponding cell has the predetermined value may include a case where the system bandwidth of the corresponding cell is 20 MHz, a case where the system bandwidth of the corresponding cell is 15 MHz, a case where the system bandwidth of the corresponding cell is 15 MHz or 20 MHz, or a case where the system bandwidth of the corresponding cell is 15 MHz or more, for example.

Here, it shows the effect that the broadcast information reception unit 112 performs determination regarding whether to regard the corresponding cell as the "restricted cell" based on the value of the AdditionalSpectrumEmission, the frequency of the downlink or the uplink, and the system bandwidth of the corresponding cell.

The degree of the above-mentioned influence of the interference signal to other systems generally depends on both whether the frequency band of the own system is close to the frequency bands of other systems and the system bandwidth. Consequently, determination regarding whether to regard the corresponding cell as the "restricted cell" is more appropriately performed by determining regarding whether to regard the corresponding cell as the "restricted cell" based on the frequency of the own system and the system bandwidth in addition to the information regarding whether the value of the AdditionalSpectrumEmission is supported.

For example, since the broadcast information reception unit 112 regards the corresponding cell as the "restricted cell" only when the frequency of the own system is close to the frequencies of other systems, the system bandwidth is wide, and the value of the AdditionalSpectrumEmission is not supported, if the frequency of the own system is remote from the frequencies of other systems or the system bandwidth is narrow, even when the value of the AdditionalSpectrumEmission is not supported, the broadcast information reception unit 112 need not regard the corresponding cell as the "restricted cell", that is, it is possible to perform communication in the corresponding cell.

Otherwise, for example, when the value of the AdditionalSpectrumEmission is NS_15, a frequency band of the corresponding cell has a predetermined value, and a system bandwidth of the corresponding cell has a predetermined value, the broadcast information reception unit 112 may also be configured to regard the corresponding cell as the "restricted cell".

The predetermined frequency band, for example, may include a band determined in advance such as a band 1 or a band 2. Otherwise, a relation between the value of the AdditionalSpectrumEmission and a value of the frequency band may be defined in advance, and the relation may also correspond to a frequency band.

Furthermore, the case where the system bandwidth of the corresponding cell has the predetermined value may include a case where the system bandwidth of the corresponding cell is 20 MHz, a case where the system bandwidth of the corresponding cell is 15 MHz, a case where the system bandwidth of the corresponding cell is 15 MHz or 20 MHz, or a case where the system bandwidth of the corresponding cell is 15 MHz or more, for example.

Here, it shows the effect that the broadcast information reception unit 112 performs determination regarding whether to regard the corresponding cell as the "restricted cell" based on the value of the AdditionalSpectrumEmission, the frequency band, and the system bandwidth of the corresponding cell.

The degree of the above-mentioned influence of the interference signal to other systems generally depends on both whether the frequency band of the own system is close to the frequency bands of other systems and the system bandwidth.

Here, when the frequency band has been specified, the frequency bands of a downlink and an uplink or the range of the frequency band is specified. Consequently, the broadcast information reception unit 112 performs determination regarding whether to regard the corresponding cell as the "restricted cell" based on the frequency band and the system bandwidth in addition to the information regarding whether the value of the AdditionalSpectrumEmission is supported, so that it is possible to more appropriately perform the determination regarding whether to regard the corresponding cell as the "restricted cell".

For example, since the broadcast information reception unit 112 regards the corresponding cell as the "restricted cell" only when the frequency of the own system is close to the frequencies of other systems, the system bandwidth is wide, and the value of the AdditionalSpectrumEmission is not supported, if the frequency of the own system is remote from the frequencies of other systems or the system bandwidth is narrow, even when the value of the AdditionalSpectrumEmission is not supported, the broadcast information reception unit 112 need not regard the corresponding cell as the "restricted cell", that is, it is possible to perform communication in the corresponding cell.

In the above-mentioned example, the broadcast information reception unit 112 performs a process on whether to regard the corresponding cell as the "restricted cell" based on the frequency of the downlink or the uplink, the system bandwidth, or the frequency band, in addition to the value of the AdditionalSpectrumEmission. However, it may be possible to perform the process on whether to regard the corresponding cell as the "restricted cell" based on at least one of the value of the AdditionalSpectrumEmission, the frequency of the downlink or the uplink, the system bandwidth, and the frequency band.

The frequency of the downlink or the uplink, the system bandwidth, or the frequency band may be notified from the base station device 200 through broadcast information, may also be notified from the base station device 200 through an RRC message, or may also be notified from the base station device 200 through a synchronization signal.

In the case where it is notified through the synchronization signal, the frequency of the downlink or the uplink, the system bandwidth, or the frequency band may also be implicitly notified, when the cell search is performed by using the synchronization signal.

Even when an information element such as AdditionalSpectrumEmission is received as an information element of an RRC message, other than broadcast information, the broadcast information reception unit 112 may also perform determination regarding whether to regard the cell as the "restricted cell" as described above.

Here, for example, when performing a handover, the user equipment 100$n$ may also receive the information element, such as the AdditionalSpectrumEmission, regarding a cell of a handover destination from a cell of a handover source.

The AdditionalSpectrumEmission may correspond to a value of AdditionalSpectrumEmission at each component carrier when carrier aggregation is performed.

That is, the broadcast information reception unit 112 may perform the above-mentioned determination for the AdditionalSpectrumEmission at each component carrier, and when unsupported AdditionalSpectrumEmission has been transmitted for at least one component carrier, the broadcast information reception unit 112 may also regard a corresponding cell as the "restricted cell".

Otherwise, the broadcast information reception unit 112 may perform the above-mentioned determination for the AdditionalSpectrumEmission at each component carrier, and when the unsupported AdditionalSpectrumEmission has been transmitted for all component carriers, the broadcast information reception unit 112 may also regard the corresponding cell as the "restricted cell".

The above-mentioned AdditionalSpectrumEmission, for example, may be transmitted as an information element of "SIB1" which is one of BCCH signals, may also be transmitted as an information element of SIB2, or may also be transmitted as an information element of MIB.

Furthermore, when the AdditionalSpectrumEmission is received as a part of an RRC message, the AdditionalSpectrumEmission is transferred to the broadcast information reception unit 112, which will be described later, via the application unit 110.

In addition, the AdditionalSpectrumEmission may also be transferred to the broadcast information reception unit 112 without passing through the application unit 110.

Meanwhile, uplink user data is input to the baseband signal processing unit 108 from the application unit 110, is subject to a transmission process of retransmission control, a channel coding process, a DFT process, an IFFT process, and the like in the baseband signal processing unit 108, and then is transferred to the transmission/reception unit 106.

The baseband signal output from the baseband signal processing unit 108 is subject to a frequency conversion process for a conversion to a radio frequency band by the transmission/reception unit 106, and then, amplified by the amplifier unit 104, followed by being transmitted through the transmission/reception antenna 102.

The uplink user data is mapped to PUSCH which is a physical channel. That is, the PUSCH having the uplink user data mapped thereto is transmitted to the base station device 200 via the baseband signal processing unit 108, the transmission/reception unit 106, the amplifier unit 104, and the transmission/reception antenna 102 as described above.

In addition, as will be described later, in an uplink, in addition to the PUSCH, PUCCH, SRS (Sounding Reference Signal), or physical random access channel (PRACH) may also be transmitted to the base station device 200 via the baseband signal processing unit 108, the transmission/reception unit 106, the amplifier unit 104, and the transmission/reception antenna 102 as described above.

The cell selection/reselection unit 114 is configured to receive DL-RS (Downlink Reference Signal), measure received signal quality of a cell in a mobile communication system, and perform cell selection/reselection based on the received signal quality of the cell.

Furthermore, the cell selection/reselection unit 114 is configured not to perform the cell selection or cell reselection with respect to a cell determined as the "restricted cell" by the broadcast information reception unit 112, as described above.

Here, the meaning that the cell selection or cell reselection is not performed with respect to the cell determined as the "restricted cell", for example, may represent an operation for not visiting or camping on the cell determined as the "restricted cell". When the cell selection or cell reselection is not performed with respect to the corresponding cell, communication with the corresponding cell is consequently prohibited. Otherwise, when the corresponding cell is not visited or camped on, communication with the corresponding cell is consequently prohibited.

The received signal quality, for example, may correspond to a reception level (RSRP: Reference Signal Received Power) of a downlink reference signal, or may also correspond to RSRQ (Reference Signal Received Quality). Here, the RSRQ is a value obtained by dividing received power of the downlink reference signal by RSSI (Received Signal Strength Indicator) of a downlink.

Here, the RSSI indicates the total reception level observed in a mobile station, and indicates a reception level including all of thermal noise, interference power from another cell, power of a desired signal from an own cell, and the like. Otherwise, the received signal quality, for example, may be expressed by a ratio of non-desired signal power with respect to desired signal power, or may also be expressed by SIR (Signal-to-Interference Ratio).

Hereinafter, with reference to FIG. 4, the operation of the user equipment 100n according to the present embodiment will be simply described.

Figure 4:
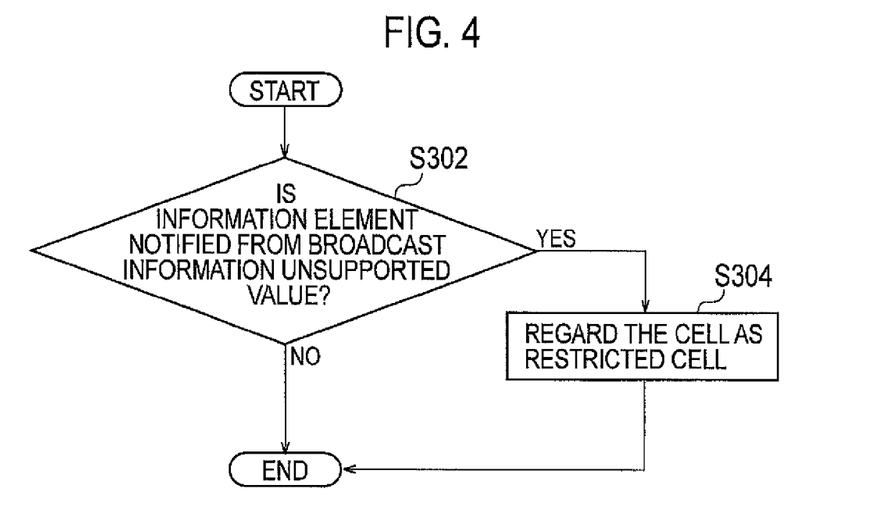
FIG. 4 is a flowchart illustrating an operation of the user equipment according to the first embodiment of the present invention.

As illustrated in FIG. 4, in step S302, the user equipment 100n determines whether an information element notified through broadcast information is an unsupported value.

Here, the information element, for example, may include information indicating a system bandwidth, information indicating an uplink frequency, information indicating a frequency band for which carrier aggregation is performed, information indicating a frequency band for transmitting uplink control information, information indicating a frequency band for transmitting a random access channel, or AdditionalSpectrumEmission. Otherwise, the information element may also include a combination of these types of information.

When the information element notified through the broadcast information is the unsupported value (step S302: YES), the procedure proceeds to step S304 so that a corresponding cell is regarded as a restricted cell. Here, the corresponding cell indicates a cell where the broadcast information is transmitted.

Meanwhile, when the information element notified through the broadcast information is not the unsupported value (step S302: NO), the procedure ends.

Hereinafter, with reference to FIG. 5, the operation of the user equipment 100n according to the present embodiment will be simply described.

Figure 5:
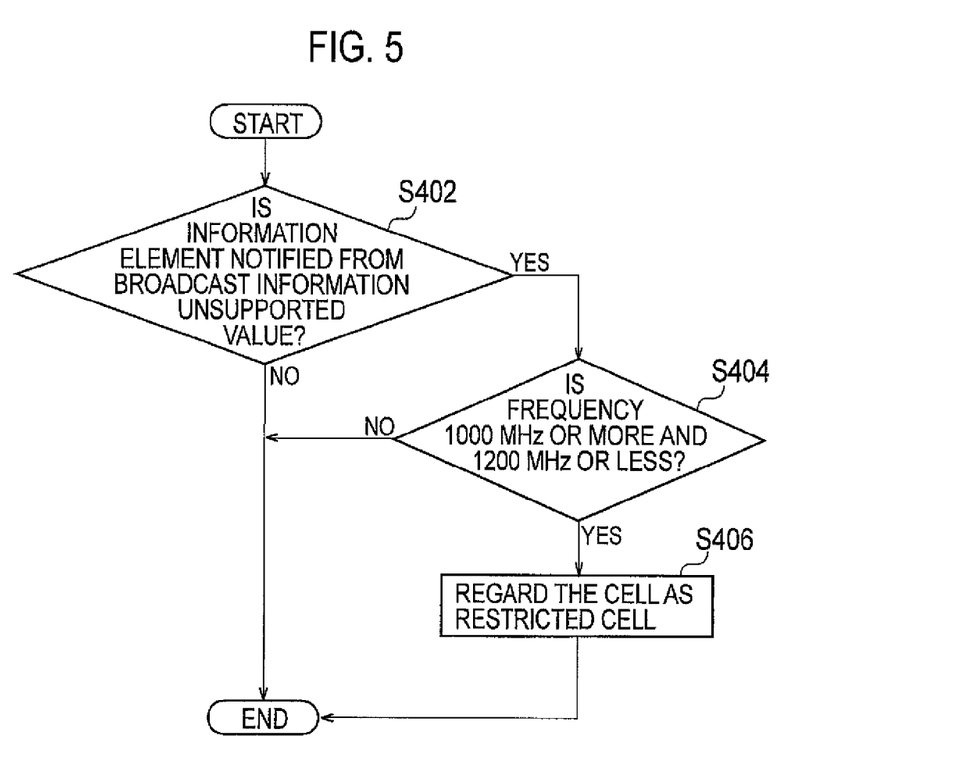
FIG. 5 is a flowchart illustrating an operation of the user equipment according to the first embodiment of the present invention.

As illustrated in FIG. 5, in step S402, the user equipment 100n determines whether an information element notified through broadcast information is an unsupported value. Here, the information element, for example, may also include AdditionalSpectrumEmission.

Otherwise, the information element, for example, may include information indicating an uplink frequency, information indicating a frequency band for which carrier aggregation is performed, information indicating a frequency band for transmitting uplink control information, information indicating a frequency band for transmitting a random access channel, or AdditionalSpectrumEmission.

When the information element notified through the broadcast information is the unsupported value (step S402: YES), the procedure proceeds to step S404 so that it is determined whether a frequency is 1000 MHz or more and 1200 MHz or less. Here, the frequency may include a downlink frequency or may also include an uplink frequency.

When the frequency is 1000 MHz or more and 1200 MHz or less (step S404: YES), the procedure proceeds to step S406 so that a corresponding cell is regarded as a restricted cell. Here, the corresponding cell indicates a cell where the broadcast information is transmitted.

Meanwhile, when the frequency is smaller than 1000 MHz or larger than 1200 MHz (step S404: NO), the procedure ends.

Furthermore, in step S402, when the information element notified through the broadcast information is not the unsupported value (step S402: NO), the procedure ends.

Hereinafter, with reference to FIG. 6, the operation of the user equipment 100n according to the present embodiment will be simply described.

Figure 6:
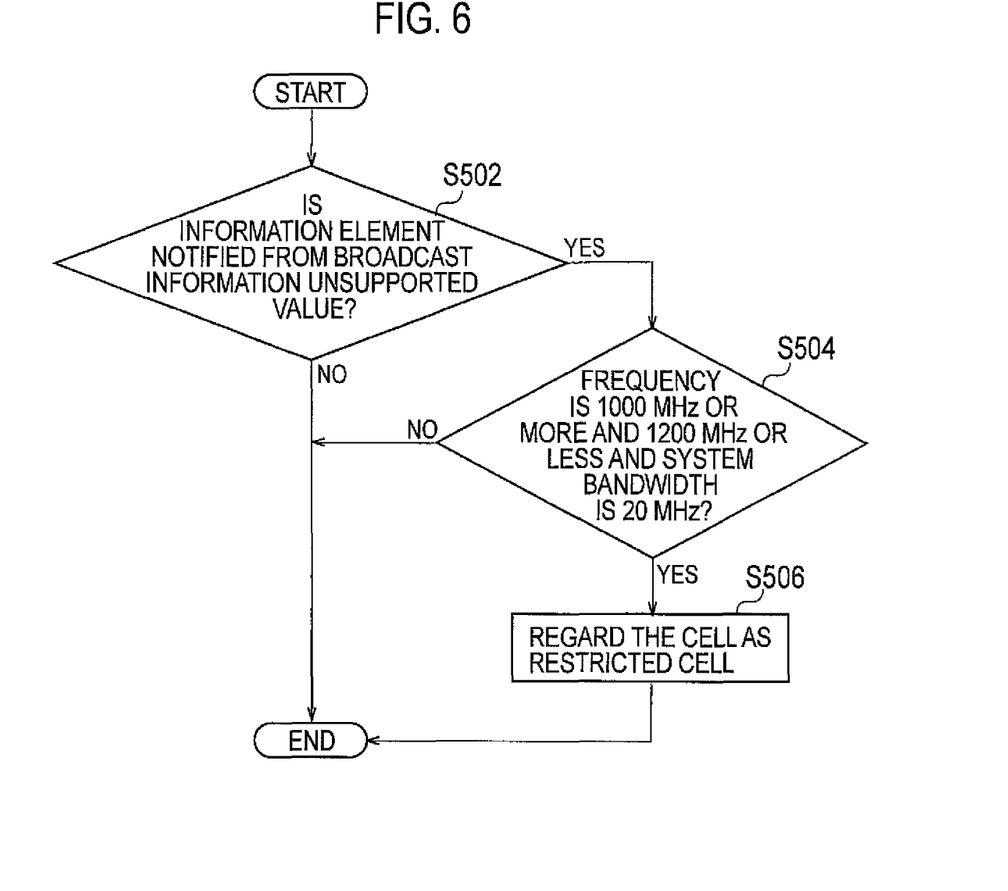
FIG. 6 is a flowchart illustrating an operation of the user equipment according to the first embodiment of the present invention.

As illustrated in FIG. 6, in step S502, the user equipment 100n determines whether an information element notified through broadcast information is an unsupported value. Here, the information element, for example, may also include AdditionalSpectrumEmission.

Otherwise, the information element, for example, may include information indicating an uplink frequency, information indicating a frequency band for which carrier aggregation is performed, information indicating a frequency band for transmitting uplink control information, information indicating a frequency band for transmitting a random access channel, or AdditionalSpectrumEmission.

When the information element notified through the broadcast information is the unsupported value (step S502: YES), the procedure proceeds to step S504 so that it is determined whether a frequency is 1000 MHz or more and 1200 MHz or less, and a system bandwidth is 20 MHz. Here, the frequency may include a downlink frequency or may also include an uplink frequency.

When the frequency is 1000 MHz or more and 1200 MHz or less, and the system bandwidth is 20 MHz (step S504: YES), the procedure proceeds to step S506 so that a corresponding cell is regarded as a restricted cell. Here, the corresponding cell indicates a cell where the broadcast information is transmitted.

Meanwhile, when the frequency is smaller than 1000 MHz or larger than 1200 MHz, or the system bandwidth is not 20 MHz (step S504: NO), the procedure ends.

Furthermore, in step S502, when the information element notified through the broadcast information is not the unsupported value (step S502: NO), the procedure ends.

(Operation and Effect of the Mobile Communication System According to the First Embodiment of the Present Invention)

In accordance with the mobile communication system according to the first embodiment of the present invention, when information included in broadcast information is an unsupported value, it is possible to avoid interference to other systems, thereby providing a service using appropriate mobile communication.

The above-mentioned characteristics of this embodiment may be expressed as follows.

A first characteristic of the present embodiment is summarized in that the user equipment 100n, which communicates with the base station device 200 in a radio manner in the cell 50 where the base station device 200 provides a mobile communication service, includes: the broadcast information reception unit 112 configured to receive broadcast information in a downlink, wherein the broadcast information reception unit 112 may also be configured to regard the cell 50 as a restricted cell when information included in the broadcast information is an unsupported value.

In the first characteristic of the present embodiment, the user equipment 100n further includes: the cell selection/reselection unit 114 configured to visit the cell 50, wherein when the broadcast information reception unit 112 regards the cell 50 as the restricted cell, the cell selection/reselection unit 114 may also be configured not to visit the cell 50.

In the first characteristic of the present embodiment, the information included in the broadcast information may also include at least one of information indicating a system bandwidth, information indicating an uplink frequency, information indicating a frequency band for which carrier aggregation is performed, information indicating a frequency band for transmitting uplink control information, information indicating a frequency band for transmitting a random access channel, or information indicating whether additional spectrum emission definition is applied.

In the first characteristic of the present embodiment, the information included in the broadcast information may also include information indicating whether additional spectrum emission definition is applied.

In the first characteristic of the present embodiment, the broadcast information reception unit 112 may also be configured to determine regarding whether to regard the cell 50 as the restricted cell based on at least one of a frequency and a system bandwidth, in addition to whether to support or non-support information indicating whether additional spectrum emission definition is applied.

A second characteristic of the present embodiment is summarized in that a mobile communication method, in which the user equipment 100n communicates with the base station device 200 in a radio manner in the cell 50 where the base station device 200 provides a mobile communication service, includes: a first step of receiving broadcast information in a downlink, wherein, in the first step, the cell 50 is regarded as a restricted cell when information included in the broadcast information is not supported.

It is noted that the operation of the base station device 200 or the user equipment 100n may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the base station device 200 or the user equipment 100n. Further, such a storage medium or a processor may be arranged, as a discrete component, in the base station device 200 or the user equipment 100n.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A user equipment, which communicates with a base station device in a radio manner in a cell where the base station device provides a mobile communication service,
when the user equipment receives a difference between a downlink frequency of a component carrier and a uplink frequency of the component carrier, in which carrier aggregation is performed, the user equipment, comprising a processor coupled to a memory, is configured to:
regard the difference between the downlink frequency of the component carrier and the uplink frequency of the component carrier, as information that is not recognizable by the user equipment, and forbid access for the cell, communication for the cell, or transmission for the cell.

2. A user equipment, which communicates with a base station device in a radio manner in a cell where the base station device provides a mobile communication service, the user equipment comprising a processor, a memory, and a broadcast information reception unit, the broadcast information reception unit configured to receive broadcast information in a downlink, wherein
the broadcast information reception unit is configured to regard the cell as a restricted cell when information included in the broadcast information is an unsupported value,
wherein the information included in the broadcast information includes information indicating whether additional spectrum emission definition is applied,
wherein the broadcast information reception unit is configured to determine whether to regard the cell as the restricted cell based on the difference between a downlink frequency and an uplink frequency, in addition to whether the user equipment recognizes a value of the information indicating whether the additional spectrum emission definition is applied.

3. A mobile communication method in a user equipment which communicates with a base station device in a radio manner in a cell where the base station device provides a mobile communication service, the mobile communication method comprising:
a first step in which the user equipment receives a difference between a downlink frequency of a component carrier and a uplink frequency of the component carrier, in which a carrier aggregation is performed, the user equipment regards the difference between the downlink frequency of the component carrier and the uplink frequency of the component carrier, as information that is not recognizable by the user equipment, wherein
in the first step, access for the cell, communication for the cell, or transmission for the cell is forbidden.

* * * * *